US008822893B2

(12) United States Patent
Lasko

(10) Patent No.: US 8,822,893 B2
(45) Date of Patent: Sep. 2, 2014

(54) COMMON FIELD MAGNETIC SUSCEPTORS

(75) Inventor: Bernard C. Lasko, Spartanburg, SC (US)

(73) Assignee: Bernard C. Lasko, Spartanburg, SC (US)

( * ) Notice: Subject to any disclaimer, the term of this patent is extended or adjusted under 35 U.S.C. 154(b) by 428 days.

(21) Appl. No.: 12/841,320

(22) Filed: Jul. 22, 2010

(65) Prior Publication Data

US 2012/0018425 A1 Jan. 26, 2012

(51) Int. Cl.
*H05B 6/10* (2006.01)
*B29C 35/12* (2006.01)
*H05B 6/30* (2006.01)

(52) U.S. Cl.
CPC .................................... *H05B 6/107* (2013.01)
USPC ........... 219/634; 219/618; 219/600; 219/759; 219/660; 219/730; 264/403; 373/139; 373/7; 373/25; 373/31

(58) Field of Classification Search
USPC ......... 219/634, 600, 618, 759, 660, 730, 672; 373/139–140, 7, 25, 31–32, 36, 47, 49, 373/83, 146, 151, 160, 150; 264/403
See application file for complete search history.

(56) References Cited

U.S. PATENT DOCUMENTS

| | | | | |
|---|---|---|---|---|
| 2,465,283 | A * | 3/1949 | Schlehr | 65/490 |
| 5,334,820 | A * | 8/1994 | Risch et al. | 219/730 |
| 2008/0034528 | A1* | 2/2008 | Bourke et al. | 15/250.06 |
| 2008/0191391 | A1* | 8/2008 | Lasko | 264/431 |

* cited by examiner

*Primary Examiner* — Dana Ross
*Assistant Examiner* — Ket D Dang
(74) *Attorney, Agent, or Firm* — Bracewell & Giuliani LLP

(57) ABSTRACT

Thermoplastic pellitized materials are melted in gravity flow through coaxially oriented perforated cylindrical metal susceptors. The susceptors are equally energized by the interception of a common magnetic field formed by a high frequency powered inductor coil.

20 Claims, 4 Drawing Sheets

COMMON FIELD MAGNETIC SUSCEPTORS

FIELD OF THE INVENTION

Cylindrical susceptors intercept a high frequency magnetic field to melt pellet form thermoplastic materials. A multi-turn magnetic induction coil and two perforated metal susceptors are vertically oriented on the same axis. A smaller diameter susceptor is placed in the coil interior and a larger diameter susceptor is placed on the coil exterior in coaxial location. When a current flows in the inductor coil, a toroid shaped magnetic field is formed. A current is induced in the field susceptors that generates controlled heat. Pelletized thermoplastic material is continuously gravity fed to fill the interior susceptor. Material is similarly fed to cover the exterior surface of the outer susceptor. Heat induced in the susceptors melts the material in contact with both surfaces. Melted material flows in the annulus between the susceptors to exit at the bottom end with minor thermal exposure time.

BACKGROUND OF THE INVENTION

Current methods of melting pelletized thermoplastic adhesive materials utilize a tank that is resistance heated to melt by heat conduction from the walls of the tank. Thermoplastic materials are poor thermal conductors. Extensive time is required to melt the entire body of material and additional electrical power is required to maintain the material in a liquid state. If tank wall surface temperatures are allowed to exceed the material application temperature to expedite melting, material degradation will occur. Many materials held at application temperature for an extended period will degrade in performance and foul the application apparatus.

Large tanks of colored polymer are propane fired or melted by heat exchange from heated oil and stirred to maintain a large batch of road striping material for intermittent application. Large tanks of asphalt are fired by propane, or resistance element heated to melt for roofing operations. Both of these applications experience overheating and start up delay, and are energy inefficient.

SUMMARY OF THE INVENTION

Magnetic induction heating of an intermediary susceptor is a method of heat transfer employed to impart heat by conduction or radiation to electrically non-conductive materials. When a susceptor having a properly arranged plurality of holes is presented to a high frequency magnetic field an electrical current will flow with even distribution around the holes and result in an evenly distributed heat. The system requirements of inductor coil form and placement, choice of electrical frequency applied, susceptor material choice and thickness, and power control are all subjects well known to those skilled in the art of induction heating process. Materials such as hot melt adhesives, asphalt, and plastisols in the form of pellets, prills, tack blocked particulate, and small chiclets are melted efficiently and on demand in the apparatus of this invention.

The apparatus of this invention presents a continuous melting method for electrically non-conductive particulate materials that can be started and stopped, as melted material demand is required. The process requires less power and does not degrade the material in the melting apparatus. When the heat of the susceptor is maintained at the target melt temperature of the material, flow volume is dependent on the viscosity of the melted material. Material presented to a surface of the perforated susceptor will flow through this interface only as fast as the material thermal conductivity will allow. Applying pressure to the material at this interface is of minor consequence to aid the speed of the process. Therefore, the process maximum volume is directly related to the surface area of the susceptor in contact with the material. The invention maximizes the melt surface area within a small envelope.

The use of melting susceptors intercepting substantially all of the empowering magnetic field is taught in Lasko U.S. Pat. No. 7,755,009. It utilizes the second susceptor to mix and add heat to the gravity flowing liquid of the melt susceptor. The multiple susceptor form of the present invention presents a second primary melt face that increases the melt surface in the same space. The use of folded susceptors is taught in Lasko U.S. Pat. No. 6,230,936. These susceptor forms are uniquely joined in this invention to provide a method of utilizing the advantages of both.

DETAILED DESCRIPTION OF THE INVENTION

Figure 1:
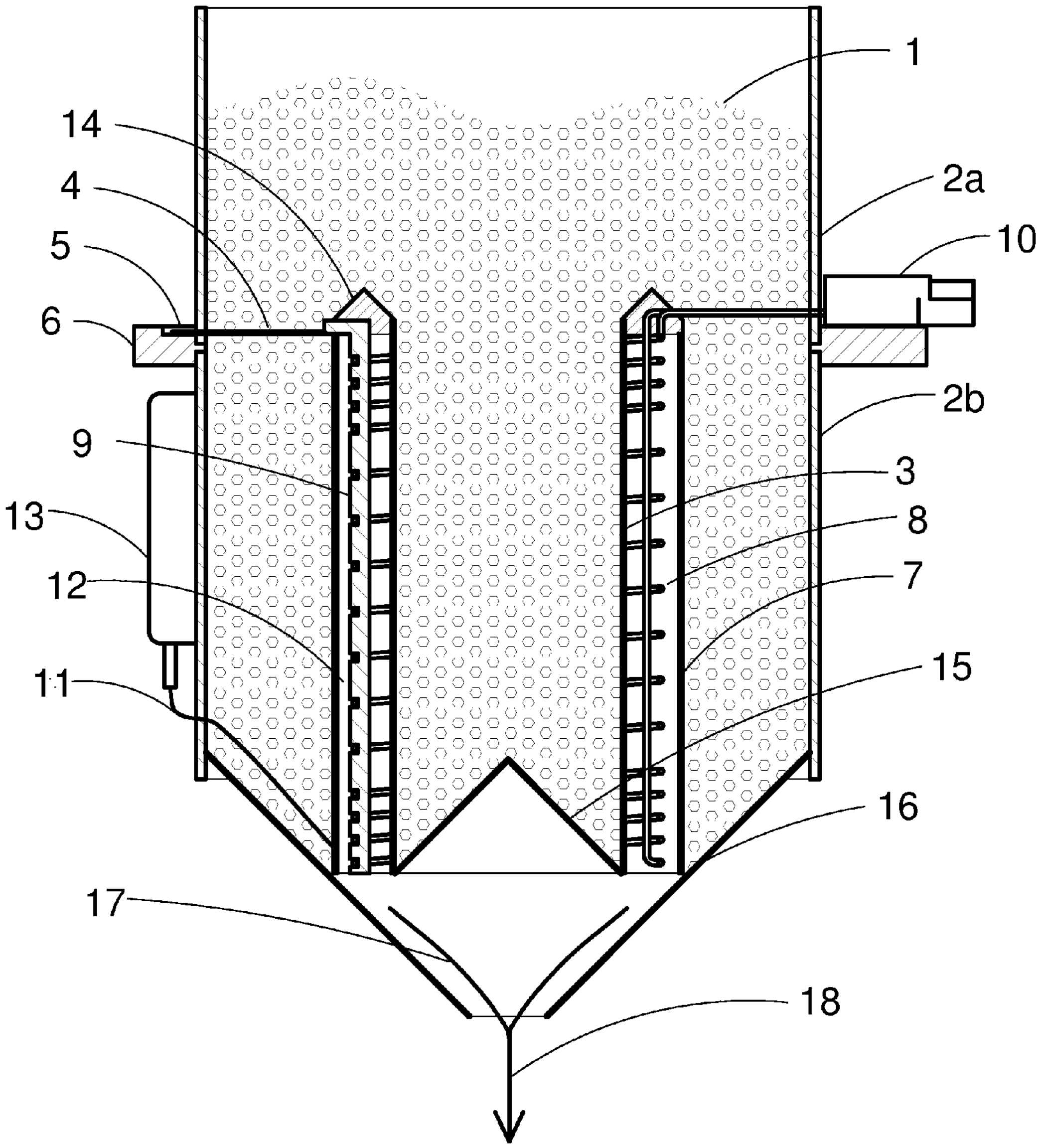
FIG. 1 is a vertical section of the melting system having cylindrical susceptors.
Figure 2:
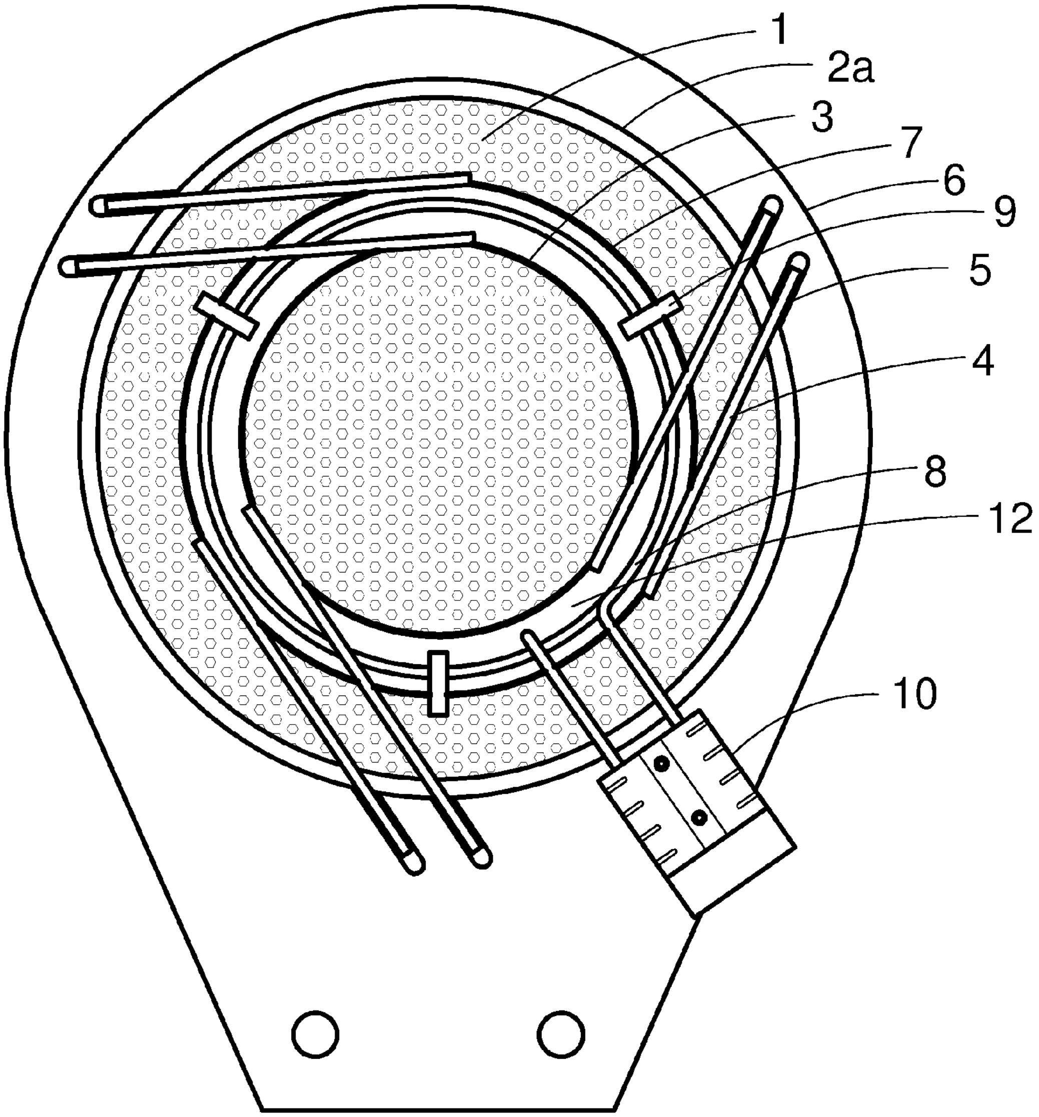
FIG. 2 is a top view of the melting system having cylindrical susceptors.

The major elements of this invention are illustrated in proportion and position in cross sectional view FIG. 1 and top view FIG. 2. Thermoplastic pellets 1 are continuously fed to a cylindrical containment vessel **2*b* with extension 2*a* acting as a removable reservoir. An inner susceptor 3, constructed of 20 ga. perforated steel, shaped as a cylinder, is suspended by three steel rods 4 that nest in locating slot 5 on support platform 6. An outer susceptor 7 of similar construction is coaxially positioned by support platform 6. A magnetic field inductor coil 8 is suspended in the annulus between susceptors 3 and 7 by three spacers 9 that rest on the upper edge of the outer susceptor 7**. The thickness of the susceptor material is chosen to minimize the latent heat on power off. It dissipates into only those pellets contacting the susceptors. This allows an initial and subsequent restarts of melt flow within a few seconds.

Inductor coil 8 is constructed of solid 14 ga. bare copper wire with spaces between the turns adjusted to present a magnetic field to the susceptors that will result in an evenly induced current flow. The diameter of inductor coil 8 is chosen to be in close proximity to the inner surface of outer susceptor 7 to impart energy in proportion to its greater mass. These are coil design methods that are well known to the practice of induction heating.

High frequency power is applied to the coil by flexible cable at connector 10. The power level is controlled by thermocouple 11 to hold the susceptors at the melt target temperature as melting material passes from the pellet exposed surfaces of susceptors 3 and 7 through their perforations. The melted material flows through annulus 12 to exit at the bottom. A wireless transmitter 13 reports the thermocouple signal to the system controller to avoid RF interference and eliminate wiring for a single control signal.

End cap 14 directs receding pellet material to the susceptor melting surfaces. Interior flow baffle 15 and exterior flow baffle 16 are 45° Teflon cones that direct material at the column bottom to prevent the slowing of material flow at this point that would cause localized over heating of an equally energized the susceptor.

Liquid material 17 gravity flows from annulus 12 to gather as a single stream of material 18. Exterior flow baffle 16 is extended to provide the gathering cone for material stream 18.

Figure 3:
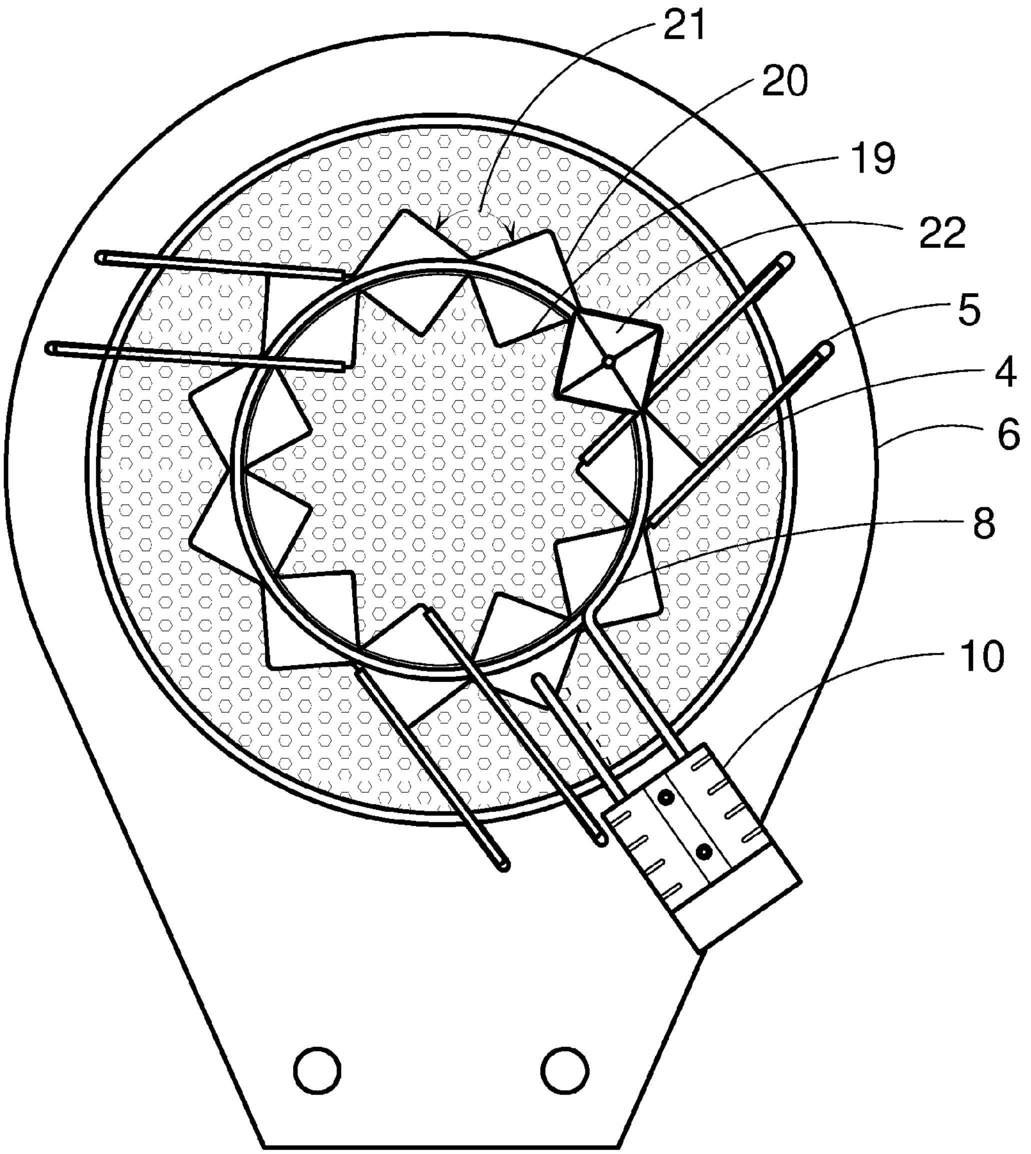
FIG. 3 is a top view of the melting system having folded cylindrical susceptors.

Another embodiment of this same melting process doubles the flow capacity by folding the susceptors as shown in top view FIG. 3. The numbers of folds, of the inner susceptor 19, are calculated to provide a total peripheral length equal to two times the diameter at the tips of the folds, thereby doubling its surface area. The surface area of the outer susceptor 20 is forced to equal the surface area of the inner susceptor by calculating the greater included angle of the fold 21 that will yield the same peripheral distance, thereby yielding a susceptor of equal mass. In this example a further refinement yields opposing 90° angles that form a chain of squares that are end caped with pyramid shapes of Teflon 22 to deflect the pellet flow. The containment vessel is the same as used in the previous example. The power applied is increased to yield two times the melt rate in the same space.

A major advantage of this folded form allows the inductor coil 8 to be positioned without concern for the greater mass normally presented by the greater diameter outer susceptor to the same magnetic field. The induced current flow in the folded susceptor follows the shape of the periphery with the same current intensity at the valleys and the tips of the folds. Therefore, the inductor coil 8 turns need be spaced in only one dimension to yield an energy distribution consistent with the materials flow characteristics.

Figure 4:
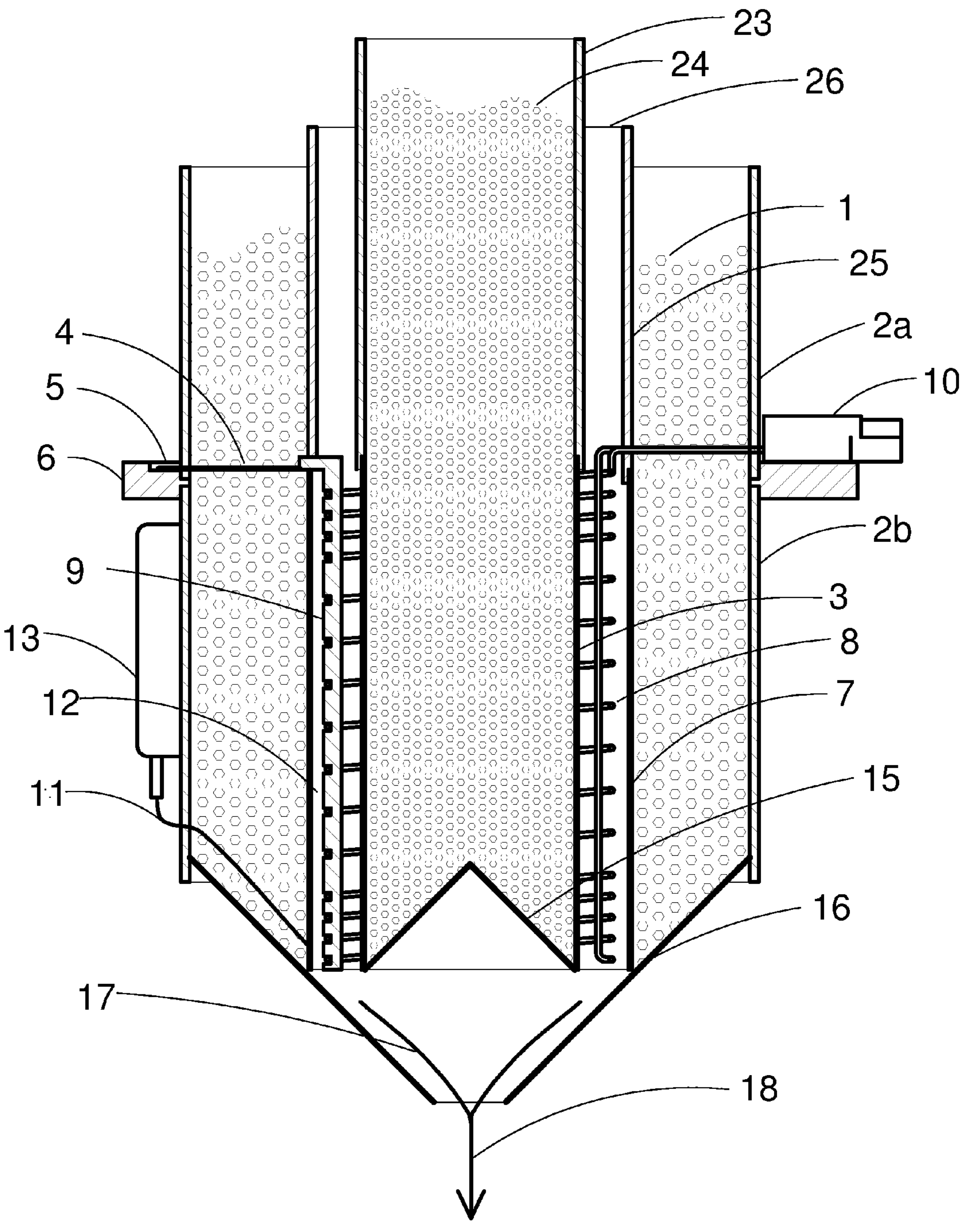
FIG. 4 is a vertical section of a melting system for combining materials.

Sectional drawing FIG. 4 is another embodiment of the invention that adds a containment cylinder 23 that provides an isolation of a different material 24 introduced to interior susceptor 3. The perforation size and thickness of susceptor 3 are chosen to accommodate the different viscosity and melt temperature of material 24 in desired proportion to material 1, while maintaining an equivalent susceptor mass.

End cap 14 is removed and cylinder 25 is added to the upper end of susceptor 7 to extend annulus 12, so that a sold particulate material can be added to the mix at entrance 26.

I claim:

1. An apparatus for heating and dispensing particulate material, comprising:

a housing having an outlet portion having an axis and a central orifice on the axis;

an outer susceptor mounted within the housing in coaxial alignment with the orifice, the outer susceptor having a perforated side wall, the side wall of the outer susceptor and the housing defining between them an annular outer bin having an inlet for receiving a portion of the particulate material prior to melting;

an inner susceptor mounted within the outer susceptor in coaxial alignment with the orifice and being non rotatable relative to the outer susceptor, the inner susceptor having a perforated side wall, the side wall of the inner susceptor and the side wall of the outer susceptor defining between them an annular heating chamber that is open to the orifice, the side wall of the inner susceptor defining an inner bin having an inlet for receiving a portion of the particulate material prior to melting;

an induction coil disposed within the heating chamber to cause the inner and outer susceptors to apply heat to the particulate material in the inner and outer bins and to cause the particulate material to melt and flow through perforations of the inner and outer susceptors into the heating chamber and from the heating chamber into the outlet portion and out the orifice; and wherein the outer bin and the inner bin having ends opposite the inlets that are closed so as to prevent the particulate material within the outer and inner bins from flowing directly to the orifice rather than through the perforations.

2. The apparatus according to claim 1, wherein:

the end of the inner bin comprises a baffle having inclined portions for directing the particulate material in the inner bin toward the inner susceptor.

3. The apparatus according to claim 2, wherein the baffle is of a nonmetallic material and has a conical shape with an apex extending away from the orifice.

4. The apparatus according to claim 1, wherein the end of the outer bin opposite the inlet of the outer bin is inclined so as to direct the particulate material within the outer bin toward the outer susceptor.

5. The apparatus according to claim 1, wherein:

a diameter of the inner susceptor at the inlet of the inner bin equals a diameter of the inner susceptor at the end of the inner bin; and a diameter of the outer susceptor at the inlet of the outer bin equals a diameter of the outer susceptor at the end of the outer bin.

6. The apparatus according to claim 1, wherein the side walls of the inner and outer susceptors comprise a plurality of folds extending from the inlets of each of the inner and outer bins to ends of the inner and outer bins opposite the inlets.

7. The apparatus according to claim 6, wherein the folds of the side wall of the inner susceptor comprise an inboard fold and an outboard fold, the inboard folds joining each other at an inboard angle, and the outboard folds joining each other at an outboard angle that differs from the inboard angle.

8. The apparatus according to claim 7, wherein the inboard angle is greater than the outboard angle.

9. The apparatus according to claim 7, wherein the folds of the side wall of the outer susceptor comprise an inboard fold and an outboard fold, the inboard folds joining each other at an inboard angle and the outboard folds joining each other at an outboard angle that differs from the inboard angle.

10. The apparatus according to claim 9, wherein the inboard angle is greater than the outboard angle.

11. The apparatus according to claim 1, further comprising:

an inboard fold and an outboard fold in the side wall of the inner susceptor, the inboard folds joining each other at an inboard angle, and the outboard folds joining each other at an outboard angle; and an inboard fold and an outboard fold in the side wall of the outer susceptor, the inboard folds of the outer susceptor joining each other at an inboard angle and the outboard folds of the outer susceptor joining each other at an outboard angle.

12. The apparatus according to claim 11, wherein the inboard angle of the folds of the inner susceptor is equal to the outboard angle of the folds of the outer susceptor.

13. The apparatus according to claim 11, wherein a surface area of the inner susceptor is equal to a surface area of the outer susceptor.

14. The apparatus according to claim 1, wherein the housing has a common bin that is open to the inlets of the outer and inner bins and contains particulate material so as to allow the particulate material contained in the common bin to flow into the inlets of both the outer and inner bins.

15. The apparatus according to claim 1, wherein the inlets of the outer and inner bins are isolated from each other to allow different types of the particulate material to be simultaneously contained in the inner and outer bins.

16. An apparatus for heating and dispensing particulate material, comprising:

a housing having a conical outlet portion having an axis and a central orifice on the axis;

a metallic outer susceptor mounted within the housing in coaxial alignment with the orifice, the outer susceptor having a perforated side wall extending around the axis, the side wall of the outer susceptor and the housing defining between them an annular outer bin having an inlet end for receiving a portion of the particulate material prior to melting and a closed end opposite the inlet end;

an inner susceptor mounted within the outer susceptor in coaxial alignment with the orifice, the inner susceptor having a perforated side wall extending around the axis, the side wall of the inner susceptor and the side wall of the outer susceptor defining between them an annular heating chamber that is open to the orifice, the side wall of the inner susceptor defining an inner bin having an inlet end for receiving a portion of the particulate material prior to melting and a closed end opposite the inlet end of the inner bin; and an induction coil disposed within the heating chamber to cause the inner and outer susceptors to apply heat to the particulate material in the inner and outer bins and cause the particulate material to melt and flow through perforations of the inner and outer susceptors into the heating chamber and from the heating chamber into the outlet portion and out the orifice.

17. The apparatus according to claim 16, wherein:

a diameter of the inner susceptor at the inlet end of the inner bin equals a diameter of the inner susceptor at the closed end of the inner bin; and a diameter of the outer susceptor at the inlet end of the outer bin equals a diameter of the outer susceptor at the closed end of the outer bin.

18. The apparatus according to claim 16, wherein the closed end of the inner bin comprises a nonmetallic baffle that has a conical shape with an apex extending away from the orifice, the baffle blocking all flow of the particulate contained in the inner bin from flowing directly into the outlet portion of the housing.

19. The apparatus according to claim 16, further comprising:

inboard folds and outboard folds in the side wall of the inner susceptor, the inboard folds joining each other at an inboard angle, and the outboard folds joining each other at an outboard angle;

inboard folds and outboard folds in the side wall of the outer susceptor, the inboard folds of the outer susceptor joining each other at an inboard angle and the outboard folds of the outer susceptor joining each other at an outboard angle; and wherein the inboard and outboard angles of the inner and outer susceptors are selected to provide a surface area of the inner susceptor equal to a surface area of the outer susceptor.

20. A method for melting particulate material, comprising:

mounting inner and outer susceptors concentrically within a housing, each of the inner and outer susceptors having a perforated side wall, defining an annular outer bin between the outer susceptor and the housing, an inner bin within the inner susceptor, and an annular heating chamber between the inner and outer susceptors that contains an induction coil;

dispensing the particulate material within the inner bin and the outer bin; and applying electrical energy to the coil, thereby heating the particulate material in the inner and outer bins and to cause the particulate material to melt and flow through perforations of the inner and outer susceptors into the heating chamber and from the heating chamber out an outlet of the housing.

* * * * *